(12) United States Patent
Ito

(10) Patent No.: US 11,162,045 B2
(45) Date of Patent: Nov. 2, 2021

(54) GREASE COMPOSITION AND SLIDING MEMBER COATED THEREWITH

(71) Applicant: Dow Corning Toray Co., Ltd., Tokyo (JP)

(72) Inventor: Hiroshi Ito, Tochigi (JP)

(73) Assignee: Dow Corning Toray Co., Ltd., Tokyo (JP)

(*) Notice: Subject to any disclaimer, the term of this patent is extended or adjusted under 35 U.S.C. 154(b) by 63 days.

(21) Appl. No.: 16/617,796

(22) PCT Filed: Mar. 14, 2018

(86) PCT No.: PCT/JP2018/010074
§ 371 (c)(1),
(2) Date: Nov. 27, 2019

(87) PCT Pub. No.: WO2018/220945
PCT Pub. Date: Dec. 6, 2018

(65) Prior Publication Data
US 2020/0115647 A1 Apr. 16, 2020

(30) Foreign Application Priority Data
May 29, 2017 (JP) .............................. JP2017-105792

(51) Int. Cl.
*C10M 107/38* (2006.01)
*C10N 20/02* (2006.01)
*C10N 20/04* (2006.01)
*C10N 20/06* (2006.01)
*F16C 33/10* (2006.01)

(52) U.S. Cl.
CPC .... *C10M 107/38* (2013.01); *C10M 2205/022* (2013.01); *C10M 2205/024* (2013.01); *C10M 2213/0623* (2013.01); *C10M 2290/00* (2013.01); *C10N 2020/02* (2013.01); *C10N 2020/04* (2013.01); *C10N 2020/06* (2013.01); *F16C 33/10* (2013.01)

(58) Field of Classification Search
CPC .............. C10M 107/38; C10M 119/22; C10M 169/02; C10M 2205/022; C10M 2205/024; C10M 2213/0606; C10M 2213/0623; C10M 2213/0626; C10M 2290/00; C10N 2020/02; C10N 2020/04; C10N 2020/06; C10N 2030/06; C10N 2030/74; C10N 2040/02; C10N 2050/023; C10N 2050/10; F16C 2210/04; F16C 2300/02; F16C 33/10; F16C 33/102; F16C 33/201
See application file for complete search history.

(56) References Cited

U.S. PATENT DOCUMENTS

2007/0213240 A1* 9/2007 Shimura .............. C10M 169/06
508/588

FOREIGN PATENT DOCUMENTS

| JP | H7-173483 A | 7/1995 |
|---|---|---|
| JP | 2006-08818 A | 1/2006 |
| JP | 2012-236935 A | 12/2012 |
| JP | 6122191 B1 | 4/2017 |

OTHER PUBLICATIONS

International Search Report of the International Searching Authority for PCT/JP2018/010074 dated Apr. 24, 2018. [See English Machine Translation].

* cited by examiner

*Primary Examiner* — Ellen M McAvoy
*Assistant Examiner* — Chantel L Graham
(74) *Attorney, Agent, or Firm* — Lorenz & Kopf, LLP

(57) ABSTRACT

Grease composition contains (A) a straight-chain perfluoropolyether having a kinematic viscosity of 2-110 mm$^2$/s at 40° C., (B) a branched perfluoropolyether having a kinematic viscosity of 2-100 mm$^2$/s at 40° C., and (C) a fluorocarbon resin powder having a primary particle size of 1 μm or less, wherein the contained amount of the fluorocarbon resin powder is 25-40 wt % with respect to the weight of the grease composition, and the weight ratio of the straight-chain perfluoropolyether (A) to the branched perfluoropolyether (B) is 15:85 to 70:30.

20 Claims, No Drawings

GREASE COMPOSITION AND SLIDING MEMBER COATED THEREWITH

FIELD OF THE INVENTION

The present invention relates to a sliding member used in automobiles and industrial machinery, as well as a grease composition used therewith.

BACKGROUND

Grease is normally used to improve the lubricity of sliding parts in various types of machinery such as automobiles, electrical equipment, information equipment, construction machinery, industrial machinery, and machine tools. Among these, automotive parts must be able to work well over a broad range of temperatures, from extremely low temperatures in cold areas where the night temperature is dozens of degrees below zero to high temperatures during exposure to hot weather in summer. Additionally, the interior structure of automobiles has been designed with enhanced sound insulation in recent years to ensure that the interior of automobiles are quieter, blocking out the noise of working automobile parts. However, the operating noise of parts used in automobile interiors has had to be minimized as much as possible.

Perfluoropolyethers have exceptional heat stability, low volatility, corrosion resistance, and low reactivity, for example, and are thus suitable as grease for sliding members in various types of machinery. Japanese Unexamined Patent Publication No. 2003-147380, Japanese Unexamined Patent Publication No. 2013-53318, and Japanese Patent No. 6122191 propose methods in which mixtures of two types of perfluoropolyethers having different main chain structures are used in order to improve operability over a broad range of temperatures, etc. However, the viscosity of the perfluoropolyethers that are actually used in these documents is either not specified or is high. The use of high-viscosity perfluoropolyethers results in poor operability at extremely low temperatures, which is a problem in applications that require good operability at extremely low temperatures such as automobile applications. These documents also do not disclose a method for reducing the operating noise, which is necessary when used for automobile interior parts, etc.

SUMMARY OF THE INVENTION

An object of the present invention is thus to provide a sliding member that has good operability and reduces operating noise over a broad range of temperatures, from extremely low to high temperatures, as well as a grease composition used therewith.

As a result of extensive research, the inventors perfected the present invention upon discovering that the above problems could be solved by a grease composition obtained by adding a specific amount of a fluororesin powder to two types of perfluoropolyethers that have different molecular structures and that each have a specific viscosity range.

Specifically, a first embodiment of the present invention is a grease composition comprising: (A) a perfluoropolyether that has a kinematic viscosity of 2-110 mm²/sec at 40□ and that is represented by general formula (1) RfO(CF$_2$CF$_2$O)$_m$(CF$_2$O)$_n$Rf (where Rf is a C$_{1-4}$ perfluoro lower alkyl group, m and n are each an integer ≥0, the sum of m and n is 30-190, and the CF$_2$CF$_2$O and CF$_2$O groups are randomly bonded in the main chain); (B) a perfluoropolyether that has a kinematic viscosity of 2-100 mm²/sec at 40□ and that is represented by general formula (2) RfO(CF(CF$_3$)CF$_2$O)$_p$(CF$_2$O)$_r$Rf (where Rf is a C$_{1-4}$ perfluoro lower alkyl group, p is a positive number, r is a number ≥0, the sum of p and r is 5-50, and the CF(CF$_3$)CF$_2$O and CF$_2$O groups are randomly bonded in the main chain); and (C) a fluororesin powder having a primary particle size ≤1 μm, wherein the fluororesin powder content is 25-40 wt % based on the weight of the grease composition, and the perfluoropolyether (A) to perfluoropolyether (B) weight ratio is 15:85 to 70:30. The above grease composition preferably furthermore contains (D) polyolefin particles having a viscosity-average molecular weight of 500,000-7,000,000 and a particle size ranging from 10-200 μm in an amount ranging from 1.5-10 wt % based on the weight of the grease composition.

A second embodiment of the present invention is a sliding member, the sliding surface of which is coated with the grease composition, wherein the oil film formed by the grease composition is ≥0.2 μm thick.

DETAILED DESCRIPTION OF INVENTION

Perfluoropolyether (A):

Component (A) used in the grease composition that is a first embodiment of the present invention is a perfluoropolyether that has a kinematic viscosity of 2-110 mm²/sec at 40□ and that is represented by general formula (1).

$$RfO(CF_2CF_2O)_m(CF_2O)_nRf \qquad (1)$$

In general formula (1), Rf is a C$_{1-4}$ perfluoro lower alkyl group, examples of which include trifluoromethyl and pentafluoroethyl groups. Rf is preferably a trifluoromethyl group.

In general formula (1), m and n are each an integer ≥0. The sum of m and n is 30-190. The ratio of m to n (m/n) is preferably 21. It should be noted that, in general formula (1), the CF$_2$CF$_2$O and CF$_2$O groups are randomly bonded in the main chain.

Perfluoropolyether (B):

Component (B) used in the grease composition of the present invention is a perfluoropolyether that has a kinematic viscosity of 2-100 mm²/sec at 40□ and that is represented by general formula (2).

$$RfO(CF(CF_3)CF_2O)_p(CF_2O)_rRf \qquad (2)$$

In general formula (2), Rf is a C$_{1-4}$ perfluoro lower alkyl group, and is specifically the same as those noted in the definition of general formula (1) above.

In general formula (2), p is a positive number, r is a number 20, and the sum of p and r is 5-50. The ratio of p to r is preferably 210, and furthermore, in general formula (2) the CF(CF$_3$)CF$_2$O and CF$_2$O groups are randomly bonded in the main chain. As p is a positive number, a branched unit is always included in general formula (2).

The perfluoropolyether (A) to perfluoropolyether (B) weight ratio is 15:85 to 70:30. A perfluoropolyether (A) weight ratio below this range will result in poor operability at low temperatures. Meanwhile, a perfluoropolyether (B) weight ratio below this range will not allow the intended thickness to be achieved when the resulting greased composition is applied, and will not allow operating noise to be reduced. The perfluoropolyether (A) to perfluoropolyether (B) weight ratio is preferably 20:80 to 70:30, and even more preferably 25:75 to 65:35.

Fluororesin Powder:

Component (C) used in the grease composition of the present invention is a fluororesin powder having a primary particle size ≤1 μm. Examples of fluororesin powder that can be used include polytetrafluoroethylene (PTFE), tetrafluoroethylene-hexafluoropropene copolymers (FEP), tetrafluoroethylene-perfluoroalkyl vinyl ether copolymers (PFA), tetrafluoroethylene-ethylene copolymers (ETFE), polyvinylidene fluorides (PVDF), polychlorotrifluoroethylene (PCTFE), and perfluoroalkylene resins. Of these, PTFE is preferred. The fluororesin powder is obtained by polymerizing the monomers by a method such as emulsion polymerization, suspension polymerization, or solution polymerization, but fluororesin powders obtained by emulsion polymerization are preferred in the present invention. That is because fluororesin powders obtained by emulsion polymerization have a large specific surface area and substantial oil absorption, and are thus less likely to separate in the grease composition, allowing a stable grease composition to be obtained. The average molecular weight of the fluororesin powder is preferably 1,000-1,000,000. The average molecular weight of the fluororesin powder can be calculated based on the value obtained by differential scanning calorimetry or by the determination of the viscoelasticity or melt flow rate.

The primary particle size of the fluororesin powder is ≤1 µm, and preferably ≤0.5 µm. The primary particle size of the fluororesin powder can be determined by scanning electron microscopy.

The fluororesin powder content is 25-40 wt %, and preferably 30-40 wt %, based on the weight of the grease composition A fluororesin powder content less than 25 wt % will result in a grease composition that is too soft and in substantial operating noise. Meanwhile, a fluororesin powder content greater than 40 wt % will result in a grease composition that is too stiff and in poor operability at low temperatures.

In order to further improve quietness and damping properties associated with sliding, such as rotation, while preserving the lubricating performance (especially torque), the grease composition of the present invention preferably furthermore contains (D) polyolefin particles having a viscosity-average molecular weight of 500,000-7,000,000 and a particle size ranging from 10-200 µm, in an amount ranging from 1.5-10 wt % based on the weight of the grease composition. The viscosity-average molecular weight of the polyolefin particles is preferably 1,000,000 to 5,000,000, and more preferably 1,000,000 to 3,000,000. A polyolefin particle viscosity-average molecular weight lower than 500,000 may lower the heat resistance of the grease. Meanwhile, at a viscosity-average molecular weight greater than 7,000,000, the impact resistance will begin to significantly deteriorate, with no improvement in the quieting and damping properties.

It should be noted that the viscosity-average molecular weight in this invention can be determined in accordance with JIS K7367, and the intrinsic viscosity of a solution obtained by dissolving the polyolefin particles in a solvent can be determined to find the viscosity-average molecular weight by the following formula.

$$\text{Intrinsic solution viscosity} = \text{coefficient}(K) \times \text{viscosity-average molecular weight}^\alpha$$

(K and α are constants.)

The average particle size (primary particle size) of the polyolefin particles is 10-200 µm, preferably 10-50 µm, and more preferably 10-30 µm. The average particle size is determined by SEM observation, but can also be determined using a Coulter counter, for example. An average polyolefin particle size of ≤10 µm will result in less distance between sliding members, making it difficult to improve quieting and damping properties. Meanwhile, an average particle size greater than 200 µm may make it more difficult for the grease to flow, resulting in lower lubricating performance (especially torque). Specific examples of polyolefins include polyethylene and polypropylene, but polyethylene has appropriate hardness and is thus preferred. The polyolefin content, based on the weight of the grease composition, is 1.5-10 wt %, preferably 1.5-7.5 wt %, and more preferably 1.7-5.0 wt %. A content less than 1.5 wt %, may fail to produce any technical effect, especially quieting properties. A content greater than 10 wt % may result in a loss of handling workability due to greater viscosity or in a loss of lubricity and in grease with lower heat resistance due to greater torque, for example.

In addition to components (A) to (D) described above, the grease composition of the present invention can include other conventionally known components, as needed, such as solid particles, antioxidants, rust inhibitors, corrosion inhibitors, extreme pressure agents, oleaginous agents, base oil diffusion inhibitors, metal deactivators, dyes, color phase stabilizers, thickeners, structure stabilizers, or other additives. In addition to these common additives, it is also possible to add various synthetic, recycled, and natural fiber materials, and adhesive substances such as rubber dust and cashew dust.

The solid particles are a component that endows the grease composition of the present invention with a desired function. The type of solid particles is not particularly limited, and examples include reinforcing fillers; thickeners; antiwear additives; pigments; coloring materials; ultraviolet absorbers; thermally conductive fillers; conductive fillers; and insulation materials or other functional particles. It should be noted that some particles can be blended as a plurality of functional particles.

Examples of antioxidants include phenolic antioxidants such as 2,6-di-tert-butyl-4-methylphenol and 4,4'-methylenebis (2,6-di-tert-butylphenol); and amine antioxidants such as alkyldiphenylamines and triphenylamines, phenyl-α-naphthylamine, phenothiazine, alkylated-α-naphthylamine, and alkylated phenothiazine.

Examples of rust inhibitors include fatty acids, fatty acid amines, metal alkyl sulfonates, amine alkyl sulfonates, oxidized paraffins, and polyoxyethylene alkyl ethers; examples of corrosion inhibitors include benzotriazoles, benzimidazoles, and thiadiazoles.

Examples of extreme pressure agents include phosphorous compounds such as phosphate esters, phosphite esters, and amine phosphate esters; sulfur compounds such as sulfides and disulfides; and metal dialkyldithiophosphates and metal dialkyldithiocarbamates.

Examples of oleaginous agents include fatty acids or esters thereof, higher alcohols, polyhydric alcohols or esters thereof, aliphatic amines, and fatty acid monoglycerides.

Examples of base oil diffusion inhibitors include silicone oils, fluorine-based silane compounds, perfluoropolyether oils with terminals modified with an alcohol or ester, for example, and acrylic block copolymers.

The cone penetration of the grease composition of the present invention is preferably 250-350, and more preferably 265-310. The cone penetration of the grease composition can be determined by the method specified in JIS K2220.

The grease composition of the present invention can be prepared by a conventionally known method.

The grease composition of the present invention allows a lubricating film to be formed when applied to the surface of rubber members, resin members, metal members, and sliding members comprising ceramic, for example. The present invention is suitable for use on sliding members comprising metal members, resin members, or combinations thereof, and particularly rotary sliding members involving rotational movement in the circumferential direction of the member, and allows the friction of moving members involving such movement to be efficiently minimized.

A second embodiment of the present invention is a sliding member, the sliding surface of which is coated with the grease composition, wherein the oil film formed by the grease composition is ≥0.2 µm thick. If the oil film formed by the grease composition is ≥0.2 µm thick, the noise caused by the operation of the sliding member can be reduced. The oil film formed by the grease composition is preferably ≥0.25 µm thick. The thickness of the oil film formed by the grease composition can be measured by optical interferometry using an EHL tester as described in Japanese Unexamined Patent Publication No. 2009-007562. As the grease composition of the present invention can form an oil film that is ≥0.2 µm thick, in other words, can form a thick coating, the upper limit of the oil film thickness is not particularly limited but, for practical purposes, should be ≤1.0 µm, and may also be ≤0.5 µm. Particularly in rotary sliding member applications, a range of 0.25-0.50 µm is preferred.

Examples of sliding member materials include metal, plastic, rubber, and combinations thereof. Examples of plastic sliding members include door panels, instrument panels, door locks, gears, belt tensioners, fixing belts, pressure belts, pads, and other sliding members for automobiles, copiers, and printers, for example; and timing belts, conveyor belts, sunroof body seals, glass runs, weather stripping, oil seals, packing, wiper blades, doctor blades, charging rollers, developing rollers, toner supply rollers, transfer rollers, heat rollers, pressure rollers, cleaning blades, paper feed rollers, conveyance rollers, intermediate transfer belts, intermediate transfer drums, and heat belts. Examples of metal sliding members include solenoid valves, electrically operated valves, crankshafts, compressor shafts, slide bearings, gears, oil pump gears, pistons, piston rings, piston pins, gaskets, door locks, guide rails, seat belt buckles, brake pads, brake pad clips, brake shims, brake insulators, hinges, screws, pressure pads, air cylinders, electric cylinders, electric actuators, and other sliding members for automobiles, copiers, printers, and industrial machinery (including semiconductor manufacturing equipment and light emitting device/display manufacturing devices). Examples of rubber sliding members include timing belts, conveyor belts, sunroof body seals, glass runs, weather stripping, oil seals, packings, wiper blades, doctor blades, charging rollers, developing rollers, toner supply rollers, transfer rollers, heat rollers, pressure rollers, cleaning blades, paper feed rollers, conveyor rollers, doctor blades, intermediate transfer belts, intermediate transfer drums, heat belts, and other driving members, sliding members, and conveyor parts, etc., for automobiles, copiers, printers, and industrial machinery. The sliding member configuration is not particularly limited, and may be, for example, fibrous or fiber-containing. Examples of fibrous or fiber-containing sliding members include vehicle seats, carpet, tire cords, and seat belts.

Applications for members to which the grease composition of the present invention is applied are not limited, and the grease composition can be used in applications such as household appliances, ships, railways, aircraft, machinery (including industrial production equipment), structures, automobile repairs, automobiles, construction, building materials, fibers, leather, stationery, woodworking, furniture, miscellaneous goods, steel sheets, cans, electronic boards, electronic components, and printing. The properties of the grease composition of the present invention render it particularly useful for automobiles and industrial machinery applications among the above The grease composition of the present invention is characterized in that it can operate well at temperatures ranging from −40□ to 200□. As there is, in particular, no loss of torque at −40□, the grease composition of the present invention is ideal for automobile and industrial machinery applications requiring operation at extremely low temperatures. Furthermore adding a specific amount of the additional component (D) will be advantageous in allowing noise associated with rotation to be suppressed and further quieted without substantive impairment of lubricity, heat resistance, or low temperature operability.

Rotary sliding members are particularly preferred as the sliding member of the present invention. Examples of the rotary sliding members include, but are not limited to, rotary shafts, bearings, gears, various belts, various heat rollers, and steering roll connectors.

The present invention can provide a sliding member that has good operability and reduces operating noise over a broad range of temperatures, from extremely low to high temperatures, as well as a grease composition used therewith.

EXAMPLES

The present invention is illustrated in greater detail by, but is not limited to, the following examples.

Examples 1-4 and Comparative Examples 1-5

The components were mixed to homogeneity in the proportions (weight parts) shown in Table 1, kneaded using a three-roll mill, and defoamed, giving grease compositions. The following components were used in Examples 1-4 and Comparative Examples 1-5

A1: Fomblin M15 (Solvay Specialty Polymers Japan K.K.): Kinematic viscosity 85 mm$^2$/sec at 40□

A2: Fomblin M30 (Solvay Specialty Polymers Japan K.K.): Kinematic viscosity 159 mm$^2$/sec at 40□

B1: Fomblin Y25 (Solvay Specialty Polymers Japan K.K.): Kinematic viscosity 80 mm$^2$/sec at 40□

B2: Fomblin Y15 (Solvay Specialty Polymers Japan K.K.): Kinematic viscosity 56 mm$^2$/sec at 40□

B3: Fomblin Y45 (Solvay Specialty Polymers Japan K.K.): Kinematic viscosity 147 mm$^2$/sec at 40□

C1: Zonyl TLP-10F-1 (Du Pont-Mitsui Fluorochemicals Co. Ltd): Primary particle size 0.1-0.3 µm C2: Lubron L-2 (Daikin Industries, Ltd.): Primary particle size 0.2-0.4 µm D: Polyethylene powder having a viscosity-average molecular weight of approximately 2,000,000 and an average particle size of 22 µm, as determined by SEM observation (SEM observation was performed at 200× magnification using a JSM-6010LA by JEOL Ltd.)

TABLE 1

|  | Examples | | | | Comparative Examples | | | | |
| --- | --- | --- | --- | --- | --- | --- | --- | --- | --- |
|  | 1 | 2 | 3 | 4 | 1 | 2 | 3 | 4 | 5 |
| A1 | 19.5 | 25 | 14 | 27 | 58.5 | 6.5 | — | 31 | 27.5 |
| A2 | — | — | — | — | — | — | 19.5 | — | — |
| B1 | 45.5 | — | — | — | 6.5 | — | — | — | — |
| B2 | — | 40 | 56 | 41 | — | 58.5 | — | 46 | 41.5 |
| B3 | — | — | — | — | — | — | 45.5 | — | — |
| C1 | 35 | — | 30 | 30 | 35 | — | 35 | — | 30 |
| C2 | — | 35 | — | — | — | 35 | — | 23 | — |
| D | — | — | — | 2 | — | — | — | — | 1 |
| Worked penetration | 284 | 279 | 300 | 291 | 282 | 286 | 281 | 369 | 288 |
| Torque (mN-m) at −40□ | 190 | 129 | 180 | 117 | 100 | 445 | 352 | 160 | 110 |
| Evaporation (%) | 3.1 | 3.5 | 3.9 | 3.8 | 2.8 | 7.8 | 2.4 | 3.8 | 4.1 |
| Oil film thickness (μm) | 0.32 | 0.28 | 0.29 | 25 | 0.15 | 0.25 | 0.39 | 0.19 | 25 |
| Operating noise | ⊚ | ⊚ | ⊚ | ⊚ | x | Δ | ⊚ | x | x |

Table 1 shows the results of the analysis of the worked penetration, oil film thickness, torque at −40□, and evaporation of the resulting grease compositions. It should be noted that the following test methods were used.

Worked penetration: The worked penetration was determined (half scale) by the method specified in JIS K2220 7.

Torque at −40□: The torque was determined with a rotational rheometer MCR 302 by Anton Paar Instruments using parallel plates 25 mm in diameter. The average torque obtained when rotated for 6 seconds at 85 rpm using a 0.2 mm gap setting at a temperature of −40 □.

Evaporation: The evaporation was determined by 24 hour testing at 100□ by the method specified in SAE AS8660.

Oil film thickness: This result was determined by optical interferometry using an EHL tester as described in Japanese Unexamined Patent Publication No. 2009-007562. The following test conditions were used.

Metal ball: Material SUJ-2, 25.4 mm in diameter
Disk: Hard glass with chrome-coated surface
Speed: Measured from 0.001 to 1.0 m/s; oil film thickness measured at 0.1 m/s (100% rolling); sample temperature: 25 □; load: 4 N (Hertz pressure: 160 MPa)

Operating noise: Unusual noise was checked for when determining the torque at −40□. It should be noted that the following criteria were used. ⊚: No unusual noise for ≥10 seconds; ○: no unusual noise for 6 seconds; Δ: unusual noise for some of 6 seconds; x: unusual noise for most of 6 seconds.

What is claimed is:

1. A grease composition comprising:
(A) a perfluoropolyether that has a kinematic viscosity of 2-110 mm²/sec at 40° C. and that is represented by general formula (1)

where Rf is a $C_{1-4}$ perfluoro lower alkyl group, m and n are each an integer ≥0, the sum of m and n is 30-190, and the $CF_2CF_2O$ and $CF_2O$ groups are randomly bonded in the main chain;
(B) a perfluoropolyether that has a kinematic viscosity of 2-100 mm²/sec at 40° C. and that is represented by general formula (2)

where Rf is a $C_{1-4}$ perfluoro lower alkyl group, p is a positive number, r is a number ≥0, the sum of p and r is 5-50, and the $CF(CF_3)CF_2O$ and $CF_2O$ groups are randomly bonded in the main chain; and (C) a fluororesin powder having a primary particle size ≤1 μm,
wherein the fluororesin powder content is 25-40 wt % based on the weight of the grease composition, and the perfluoropolyether (A) to perfluoropolyether (B) weight ratio is 15:85 to 70:30.

2. The grease composition as claimed in claim 1, furthermore comprising (D) polyethylene and/or polypropylene particles having a viscosity-average molecular weight of 500,000-7,000,000 and a particle size ranging from 10-200 μm in an amount of 1.5-10 wt % based on the weight of the grease composition.

3. The grease composition as claimed in claim 1, wherein the m/n ratio in general formula (1) is ≥1, and the p/r ratio in general formula (2) is ≥10.

4. The grease composition as claimed in claim 1, wherein the fluororesin powder is obtained by emulsion polymerization.

5. A sliding member, the sliding surface of which is coated with the grease composition as claimed in claim 1, wherein the oil film formed by the grease composition is ≥0.2 μm thick.

6. The sliding member as claimed in claim 5, which operates at temperatures ranging from −40° C. to 200° C.

7. The sliding member as claimed in claim 5, which is included as a part in an automobile or industrial machinery.

8. The sliding member as claimed in claim 5, wherein the sliding member is a rotary sliding member.

9. A rotary sliding member comprising a metal member, a resin member, or a combination thereof, the sliding surface of which is provided with a lubrication coating comprising the grease composition as claimed in claim 1 to an oil film thickness of 0.25-0.50 μm.

10. The sliding member as claimed in claim 5, wherein the grease composition furthermore comprises (D) polyethylene and/or polypropylene particles having a viscosity-average molecular weight of 500,000-7,000,000 and a particle size ranging from 10-200 μm in an amount of 1.5-10 wt % based on the weight of the grease composition.

11. The sliding member as claimed in claim 5, wherein the m/n ratio in general formula (1) is ≥1, and the p/r ratio in general formula (2) is ≥10.

12. The sliding member as claimed in claim 5, wherein the fluororesin powder is obtained by emulsion polymerization.

13. The rotary sliding member as claimed in claim 9, wherein the grease composition furthermore comprises (D) polyolefin particles having a viscosity-average molecular weight of 500,000-7,000,000 and a particle size ranging from 10-200 μm in an amount of 1.5-10 wt % based on the weight of the grease composition.

14. The rotary sliding member as claimed in claim 9, wherein the m/n ratio in general formula (1) is ≥1, and the p/r ratio in general formula (2) is ≥10.

15. The rotary sliding member as claimed in claim 9, wherein the fluororesin powder is obtained by emulsion polymerization.

16. A grease composition comprising:
(A) a perfluoropolyether that has a kinematic viscosity of 2-110 mm$^2$/sec at 40° C. and that is represented by general formula (1)

$$RfO(CF_2CF_2O)_m(CF_2O)_nRf \quad (1)$$

where Rf is a $C_{1-4}$ perfluoro lower alkyl group, m and n are each an integer ≥0, the sum of m and n is 30-190, and the $CF_2CF_2O$ and $CF_2O$ groups are randomly bonded in the main chain;
(B) a perfluoropolyether that has a kinematic viscosity of 2-100 mm$^2$/sec at 40° C. and that is represented by general formula (2)

$$RfO(CF(CF_3)CF_2O)_p(CF_2O)_rRf \quad (2)$$

where Rf is a $C_{1-4}$ perfluoro lower alkyl group, p is a positive number, r is a number ≥0, the sum of p and r is 5-50, and the $CF(CF_3)CF_2O$ and $CF_2O$ groups are randomly bonded in the main chain; and
(C) a fluororesin powder having a primary particle size ≤1 μm,
wherein the fluororesin powder content is 25-40 wt % based on the weight of the grease composition, and the perfluoropolyether (A) to perfluoropolyether (B) weight ratio is 15:85 to 70:30, and
furthermore comprising (D) polyethylene and/or polypropylene particles having a viscosity-average molecular weight of 500,000-7,000,000.

17. The grease composition of claim 16 wherein the (D) polyethylene and/or polypropylene particles have a particle size from 10-200 μm and have a viscosity-average molecular weight of 1,000,000-3,000,000 and are present in an amount of 1.5-10 wt % based on the weight of the grease composition.

18. A grease composition comprising:
(A) a perfluoropolyether that has a kinematic viscosity of 85 mm$^2$/sec at 40° C. that is present in an amount of from 14-27 wt % based on a total weight of the grease composition and that is represented by general formula (1)

$$RfO(CF_2CF_2O)_m(CF_2O)_nRf \quad (1)$$

where Rf is a $C_{1-4}$ perfluoro lower alkyl group, m and n are each an integer ≥0, the sum of m and n is 30-190, and the $CF_2CF_2O$ and $CF_2O$ groups are randomly bonded in the main chain;
(B) a perfluoropolyether that has a kinematic viscosity of 56-80 mm$^2$/sec at 40° C. that is present in an amount of from 40-56 wt % based on a total weight of the grease composition and that is represented by general formula (2)

$$RfO(CF(CF_3)CF_2O)_p(CF_2O)_rRf \quad (2)$$

where Rf is a $C_{1-4}$ perfluoro lower alkyl group, p is a positive number, r is a number ≥0, the sum of p and r is 5-50, and the $CF(CF_3)CF_2O$ and $CF_2O$ groups are randomly bonded in the main chain; and
(C) a fluororesin powder having a primary particle size of 0.1-0.4 μm and present in an amount of 30-35 wt % based on the weight of the grease composition.

19. The grease composition of claim 18 further comprising (D) polyethylene and/or polypropylene particles having a viscosity-average molecular weight of 2,000,000 and a particle size of 22 μm and present in an amount of 2 wt % based on a total weight of the grease composition.

20. The grease composition of claim 19 wherein the (D) particles are further defined as polyethylene particles.

* * * * *

UNITED STATES PATENT AND TRADEMARK OFFICE
CERTIFICATE OF CORRECTION

| | | |
|---|---|---|
| PATENT NO. | : 11,162,045 B2 | Page 1 of 1 |
| APPLICATION NO. | : 16/617796 | |
| DATED | : November 2, 2021 | |
| INVENTOR(S) | : Hiroshi Ito | |

It is certified that error appears in the above-identified patent and that said Letters Patent is hereby corrected as shown below:

On the Title Page

In the Applicant section, the Applicant name "Dow Corning Toray Co., Ltd.," should read --DUPONT TORAY SPECIALTY MATERIALS KABUSHIKI KAISHA,--

In the Assignee section, the Assignee name "Dow Corning Toray Co., Ltd.," should read --DUPONT TORAY SPECIALTY MATERIALS KABUSHIKI KAISHA,--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*